(12) United States Patent
Colson

(10) Patent No.: US 7,238,398 B2
(45) Date of Patent: Jul. 3, 2007

(54) ANTENNA BIRD

(76) Inventor: John Randall Colson, 7635 Metropolis Lake Rd., West Paducah, KY (US) 42086

( * ) Notice: Subject to any disclaimer, the term of this patent is extended or adjusted under 35 U.S.C. 154(b) by 0 days.

(21) Appl. No.: 11/401,747

(22) Filed: Apr. 12, 2006

(65) Prior Publication Data

US 2006/0246237 A1    Nov. 2, 2006

Related U.S. Application Data

(60) Provisional application No. 60/676,547, filed on May 2, 2005.

(51) Int. Cl.
*B60R 13/00* (2006.01)
(52) U.S. Cl. ...................................................... 428/31
(58) Field of Classification Search .................. 428/31, 428/2; 446/34, 36, 40, 57, 39; 40/3, 312, 40/413; 43/3, 43
See application file for complete search history.

(56) References Cited

U.S. PATENT DOCUMENTS

| 1,441,261 A | * | 1/1923 | Ackman | 40/413 |
| 1,577,169 A | * | 3/1926 | Boyle | 446/34 |
| 1,666,806 A | * | 4/1928 | Wright | 40/413 |
| 1,755,630 A | * | 4/1930 | Budde | 40/413 |
| 1,863,179 A | * | 6/1932 | Worms | 40/413 |
| 1,927,399 A | * | 9/1933 | Godman | 40/413 |
| 2,066,641 A | * | 1/1937 | Remer et al. | 33/264 |
| 2,149,666 A | * | 3/1939 | Christiansen | 472/11 |
| 2,564,213 A | * | 8/1951 | Redhead | 40/413 |
| 3,140,560 A | * | 7/1964 | Gutierrez | 446/230 |
| 4,067,139 A | * | 1/1978 | Pinkerton et al. | 446/31 |
| 6,106,354 A | * | 8/2000 | Harry | 446/30 |
| 2005/0215168 A1 | * | 9/2005 | Kimura | 446/34 |

* cited by examiner

*Primary Examiner*—Jennifer McNeil
*Assistant Examiner*—Gordon R. Baldwin

(57) ABSTRACT

An antenna bird includes an ornamental element having the form of an aircraft which is capable of being secured to the antenna of the vehicle. The ornamental element includes at least one fuselage, a plurality of wings extending from the center line of the fuselage, at least one elevator and at least one rudder connected to the posterior end of the fuselage and an engine compartment at the anterior end of the fuselage. On ornaments depicting multi-engine aircraft or spacecraft, the engine compartments could be located on the wings, or near the tail section of the fuselage. Attachment to the vehicle antenna is accomplished through the incorporation of a plurality of support shafts each having a spherical object securely attached to one end. These spherical objects engage a concave compartment containing a slotted channel within the wings toward the leading edge. The spherical objects pivot within the concave compartment and the shafts arc through the channel as the antenna bends under induced drag thereby allowing the ornament to maintain a level attitude. The opposite end of the shafts are securely attached to a collector pylon that frictionally engages an antenna retainer which encompasses the tip of a vehicle antenna. An antenna bird can be in the form of civilian aircraft, military aircraft or space craft. An antenna bird can depict propeller driven aircraft, jet powered aircraft or rocket powered spacecraft. A propeller driven ornament includes a wind driven propeller assembly that rotates when the vehicle is in motion, thereby giving the appearance of powered flight. An antenna bird can also be constructed of various lightweight materials such as plastic, resin, fiberglass, etc.

3 Claims, 5 Drawing Sheets

ANTENNA BIRD

CROSS REFERENCE TO RELATED APPLICATION

This application claims the benefit of U.S. Provisional Patent application Ser. No. 60/676,547, filed May, 2, 2005.

BACKGROUND OF THE INVENTION

The present invention relates generally to an inexpensive and easy to manufacture ornament for a vehicle antenna, and particularly to an antenna ornament that accurately depicts a specific model of aircraft, having flight characteristics to provide level, stable flight, while the vehicle is both in motion, and at rest.

Field of the invention

It is common practice for people to show their enthusiasm for their hobbies or other areas of interest by displaying various souvenirs and memorabilia, wearing clothing designed to inform others of their interests, or by having vanity license plates on their vehicles. Individuals with an interest in aviation often wear shirts or ball caps with aviation related graphics on them. Items such as these are often purchased at air shows.

Individuals who attend air shows do so in order to see aerobatic performers such as the Navy's Blue Angels, as well as to see their favorite aircraft up close, opportunities that few will have in any other setting.

Inevitably, they will have a specific aircraft that will capture their attention, and they will want a unique souvenir depicting that aircraft.

There are many model airplanes on the market, but they are not suitable for other than static display. The antenna Bird will not only announce the individual's interest in aviation, but it will also travel with them as they drive down the road, allowing everyone they pass to take notice of their passion for aviation.

REFERENCES CITED

U.S. Patent Documents

| | | |
|---|---|---|
| 1441261 | January, 1923 | Ackman |
| 1524313 | January, 1925 | Rumohr |
| 1531566 | March, 1925 | Moiseve |
| 1666806 | April, 1928 | Wright |
| 1927399 | September, 1933 | Godman |
| 2149666 | March, 1939 | Christiansen |
| 2219658 | October, 1940 | Pasek |
| 2637928 | May, 1953 | Tufts |
| 3022069 | February, 1962 | Pettit |
| 5027539 | July, 1991 | Orsini |
| 6598556 | July, 2003 | Peters |

DESCRIPTION OF PRIOR ART

Various prior art devices comprise aircraft style ornaments which are mounted on rigid shafts attached to a portion of an automobile, usually to the radiator cap.

Prior art such as:
U.S. Pat. No. 1,441,261 Ackman, Jan., 1923.
U.S. Pat. No. 1,524,313, Romohr, Jan., 1925.
U.S. Pat. No. 1,531,566, Moiseve, Mar., 1925.
U.S. Pat. No. 1,927,399, Godman, Sep. 1933.
U.S. Pat. No. 2,637,928, Tufts, May, 1953.
are all examples of aircraft type ornaments attached to a rigid rod which is mounted to an automobile.

However, exposed radiator caps are no longer common on vehicles, and the prior art of this sort will not function on modern, flexible radio antennas. The problem being that such art was designed to be closely mounted on a rigid shaft that will resist the forces of induced drag thereby keeping the ornament in a level attitude as it moves up and down on the shaft. If this device were to be mounted, as designed, on a modern, flexible radio antenna, the induced drag would force the ornament rearward, bending the antenna as it moved. As the antenna shaft bends, the ornament would arc into a nose high attitude increasing the angle of attack on the wings.

This would make the ornament subject to even more induced drag as the lower surfaces of the ornament are exposed to the wind. The result would be wing stall and the ornament would experience a flat spin. These ornaments were simply not designed to be mounted on flexible radio antennas or to be subjected to the higher speeds at which modern vehicles travel.

Other prior art incorporates toy airplanes mounted on rigid shafts which are connected to another device to provide motion. These devices were designed to be used on a stable platform, such as a floor or table.

These examples, such as:
U.S. Pat. No. 2,149,666, Christiansen, Mar. 1939.
U.S. Pat. No. 2,219,658, Pasek, Oct. 1940.
U.S. Pat. No. 3,022,069, Pettit, Feb. 1962.
are not capable of being mounted to an vehicle antenna, nor are they capable of producing stable, level flight characteristics.

None of the above mentioned inventions and patents, taken either singly or in any combination thereof, is seen to describe the instant invention as claimed.

Accordingly, there is a substantial need for a realistic, vehicle antenna ornament that will adequately express one's enthusiasm for aviation. In addition to overcoming the problems and failures noted above, the present invention provides a unique outlet for expressing one's enthusiasm for aviation in a manner that is eye catching, provides realistic flight characteristics, and is easy to attach to the vehicle antenna. It can also be inexpensively manufactured to depict any type of aircraft; civilian, military, spacecraft, single engine, multi-engine, propeller driven, jet engine driven or rocket powered.

SUMMARY OF THE INVENTION

In accordance with the objects of the invention, an antenna bird is provided for use in conjunction with a fixed vehicle antenna. The antenna bird includes an ornamental element which is capable of being secured to the antenna of the vehicle by a method which will insure stability of the ornament while in motion or while at rest. The ornamental element includes an elongated body with opposing wings extending from the center line of the body, a vertical rudder and a horizontal elevator at the rear of the body, and other design characteristics as to represent a method of propulsion. The ornamental element is attached to a collector pylon by the incorporation of a plurality of attachment shafts that are rotationally connected to a recessed concave indention within the wings.

Spherical objects on the end of the attachment shafts which rotationally engage the recessed concave indentions within the wings, allow the ornamental element to pivot on the attachment shafts as the ornament encounters wind resistance and is forced to the rearward as the antenna bends due to induced drag. The ability to pivot on the attachment shafts allows the ornamental element to maintain a level flight attitude while the vehicle is in motion, as the rear elevator provides lift to the rear of the ornament and raises the rear section of the body into a level attitude. The lower end of the attachment shafts are connected to the collector pylon which encompasses the vehicle antenna shaft. The collector pylon is retained on the vehicle antenna by an antenna retainer which envelopes the tip of the antenna and is sized as to correspond to the central bore of the collector pylon. A central bore in the antenna retainer is sized as to correspond with the shaft of the antenna, as to prevent the antenna retainer from slipping over the tip of the antenna.

The ornamental element can be in the form of a civilian aircraft, a military aircraft, a single engine aircraft, a multi-engine aircraft, propeller driven aircraft, jet powered aircraft, rocket powered aircraft, spacecraft or gliders.

These and other objects of the invention will become readily apparent upon further review of the following descriptions and drawings.

DETAILED DESCRIPTION OF THE PREFERRED EMBODIMENTS

Figure 1:
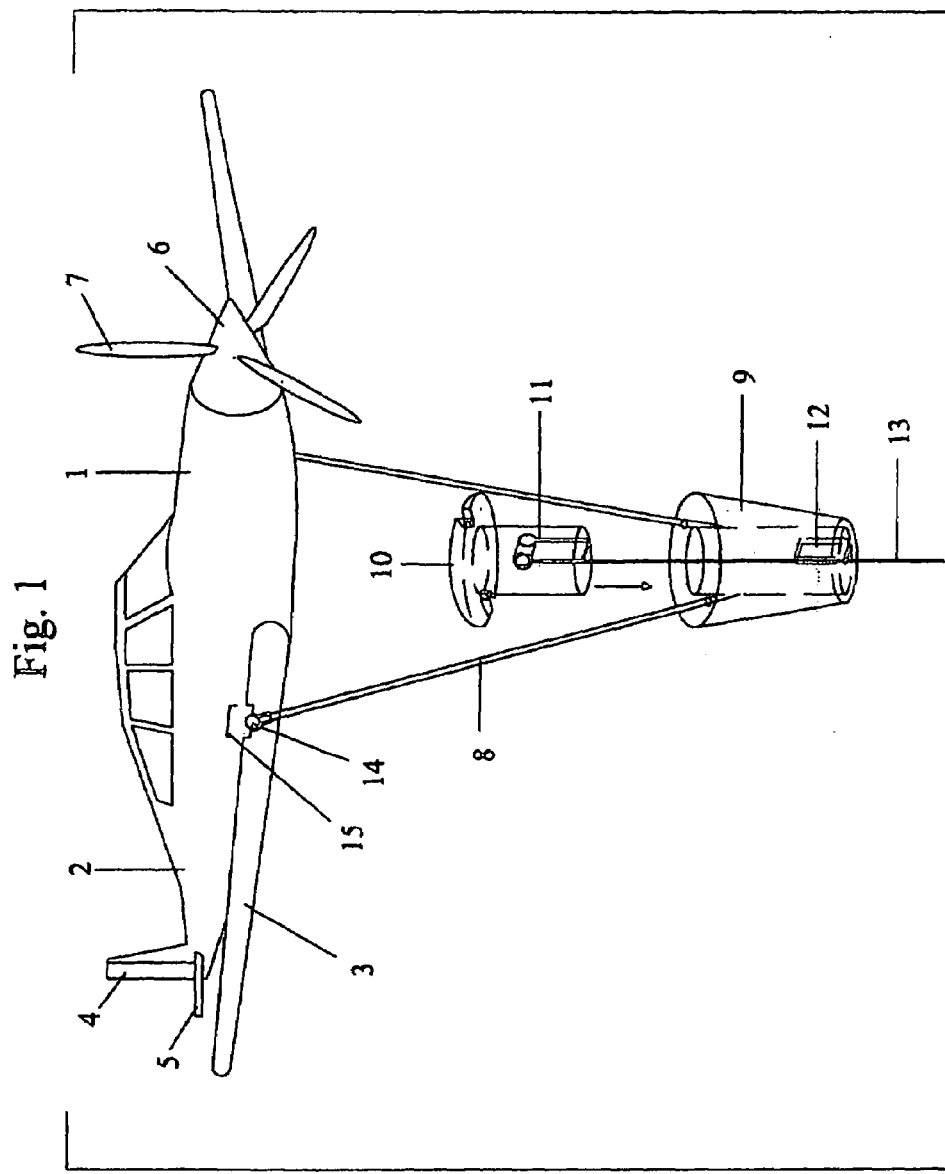
FIG. 1. Is an exploded view of the invention as to shown relationship to the vehicle antenna.

Referring to FIG. 1 of the drawings, the preferred embodiment of the Antenna Bird is an ornament designed to be attached to the antenna of a vehicle and includes a ornamental element in the form of an aircraft. This ornament can include a ornamental body or fuselage (1), a tail section (2), wings (3), vertical rudder (4), elevators (5), a rotating propeller assembly (6), and propeller (7). This ornamental body is to be in all respects accurate as to the aircraft depicted, having all cosmetic design features of a full size aircraft, whether it be a civilian aircraft, a military aircraft or a space craft.

Figure 3:
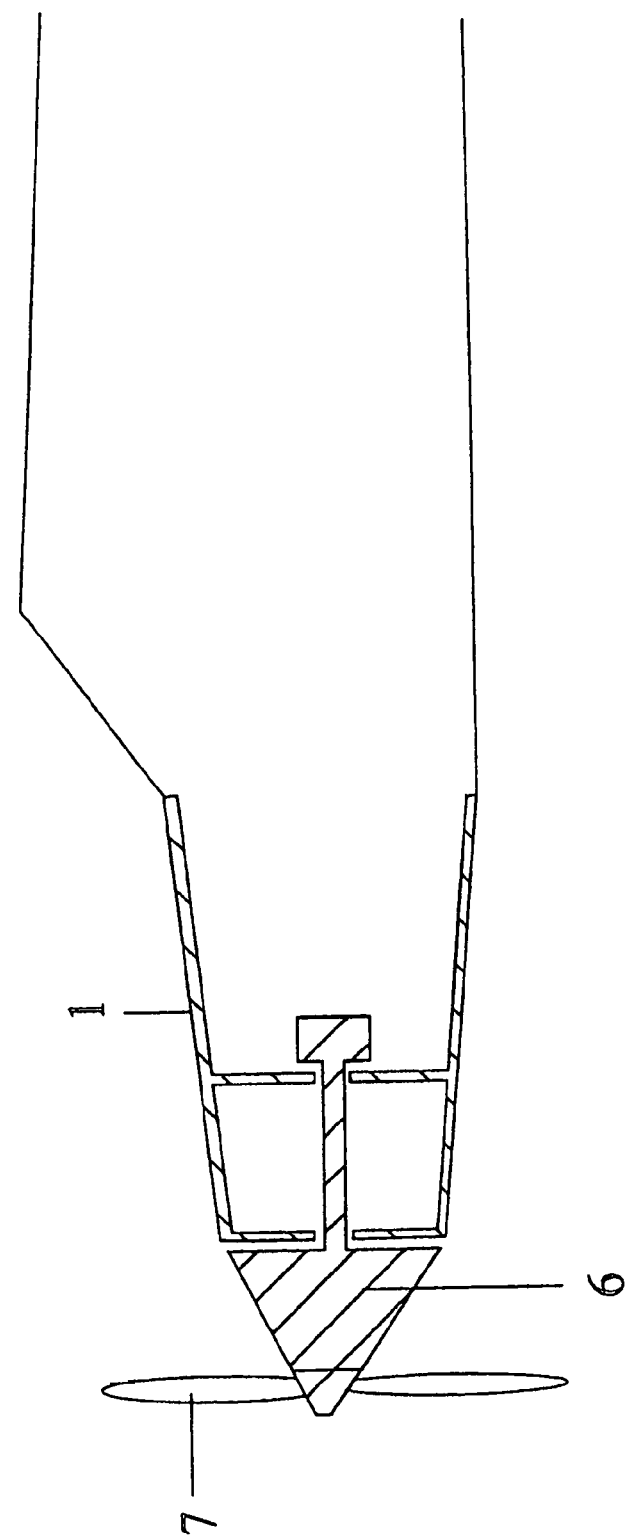
FIG. 3. is a section view illustrating the rotating propeller assembly.
Figure 4:
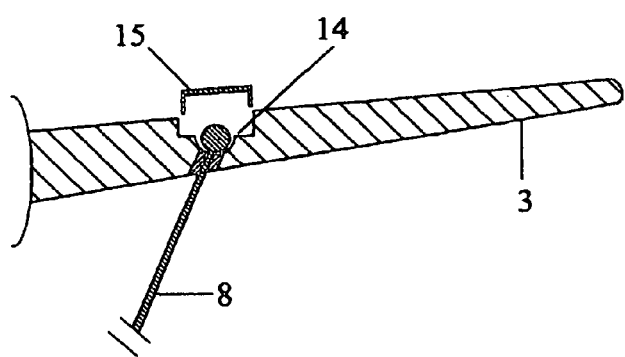
FIG. 4. illustrates the connection between the attachment shaft with spherical object on one end rotationally engaging the recessed concave indention within the wing.

The ornamental body (1) is connected to a collector pylon (9) by means of two, rigid shafts (8), each of which has a solid sphere formed on one end. The sphere rests in a recessed, concave indentation (14) formed inside the wing (3), near the wing root, with the shaft (8) protruding through the channel in the underside of the wing (3) as shown in detail in FIG. 4. A tight fitting cover (15) retains the sphere in place to prevent the ornamental body (1) from sliding down the shaft (8) when not in motion. The opposite end of the shaft (8) is securely attached to the collector pylon (9). The ornamental body can further include a rotating propeller assembly (6) which connects two or more propeller blades (7). As shown in FIG. 3, the propeller blades (7) are angled to rotationally displace as they encounter wind resistance, thereby spinning the propeller assembly (6) and giving the impression of powered flight. The rotating propeller assembly (6) is held in place within the ornamental body (1) by a shaft connected with a solid stop, that is secured by interior partitions as shown in FIG. 3.

The collector pylon (9) is a solid object with a tapered profile as to provide reduced drag when the ornament is in motion. The collector pylon further has an interior bore sized to frictionally engage the antenna retainer (10). Frictional engagement of the antenna retainer (10) will be sufficient as the only downward loading this connection will be required to resist is the dead load of the ornamental body (1), attachment shafts (8) and the collector pylon (9), when the ornament is not in motion. The collector pylon (9) further has opposing holes in the top surface as to allow insertion of the attachment shafts (8). The collector pylon (9) further has an antenna retainer spline (12), formed inside the central bore to engage the antenna shaft (13) below the tip as to prevent the antenna (13) from displacing from the antenna retainer (10).

The collector pylon (9) is secured to the vehicle antenna (13) using an antenna retainer (10). This antenna retainer (10) is a solidly formed, mushroom shaped, object having a body or "stalk" with a diameter as to allow frictional engagement within the bore of the collector pylon (9). The body of the antenna retainer (10) will have a hole in the side of the body to allow insertion of the tip of the vehicle antenna (13), and a channel (11) cut from the antenna insertion hole downward to allow insertion of the shaft on the antenna (13).

The top portion or "cap" of the antenna retainer (10), is rounded to provide reduced drag when the ornament is in motion. The cap incorporates opposing slots to allow the attachment shafts (8) to pass through.

Manufacture of the Invention

Common methods of construction, such as die cast, or injection molding, would be the preferred methods of manufacture for this invention. The ornamental body (1), wings (3), vertical rudder (4), elevators (5), rotating propeller assembly (6) could be manufactured using the same methods and techniques as is the industry standard for manufacturing die cast model aircraft. However, care should be exercised to insure that the wings (3) and rotating propeller assembly (6) are constructed with materials and methods capable of withstanding all imposed loads. The collector pylon (9) and the antenna retainer (10) could be manufactured as individual pieces using die cast techniques as well. The shafts (8) could be manufactured from a material such as spring steel in a method common to the manufacture of bicycle spokes, possibly having the sphere molded to them in a later process.

Assembly of the Invention

Assembly of the ornament is accomplished by inserting the attachment shafts (8) downward, from the top side of the wings (3) into the channel of the recessed concave indentations (14) within the wings (3) as to allow the sphere to rest in the concave indentation (14). The cover (15) is then inserted over the spherical end of the shafts (8) thereby securing them inside the recessed, concave indentations (14). The opposite end of the attachment shafts (8) is then threaded into holes in the collector pylon (9). This assembly is then fitted over the tip of the vehicle antenna (13), with the vehicle antenna (13) entering the collector pylon (9) from the bottom side, through the bore and continuing until the vehicle antenna (13) tip exits out the top side of the collector pylon (9).

The antenna retainer (10) is then inserted over the vehicle antenna (13) as to allow the tip of the antenna (13) to engage the hole in the side of the antenna retainer (10) with the shaft of the antenna (13) engaging the antenna insertion channel (11). The antenna (13) is inserted to the center of the antenna retainer (10). The collector pylon (9), with attached ornament body facing in the direction of travel, is then moved upward to allow the bore of the collector pylon (9) to encompass the shaft of the antenna retainer (10) in such a manner as to allow the antenna retainer spline (12) to enter into the antenna insertion channel (11) and the slots on the top of the antenna retainer (10) to allow passage of the attachment shafts (8).

The Invention in Use

All imposed loads, such as drag produced by the ornamental body (1), wings (3), rudder (4), elevators (5) or propeller assembly (6) passing through the air when the ornament is in motion as well as lift produced by the wings (3) are resisted by the antenna retainer (10), and collector pylon (9). The bore of the antenna insertion channel (11) is smaller than the diameter of the tip of the antenna (13) and thus will not allow the antenna retainer (10) to slide upwards and off of the antenna (13) as induced drag and lift produced by the wings (3) pulls the ornament upward against it. Expansion of the antenna retainer (10) shaft, and slippage of the antenna (13) tip, is resisted by the bore of the collector pylon (9). The antenna retainer spline (12) prevents the antenna (13) from slipping out of the antenna insertion channel (11), and allows for a tight fit against the antenna (13). The body of the collector pylon (9) is held in place against induced drag and lift by the "cap" of the antenna retainer (10).

The Invention in Motion

Figure 2:
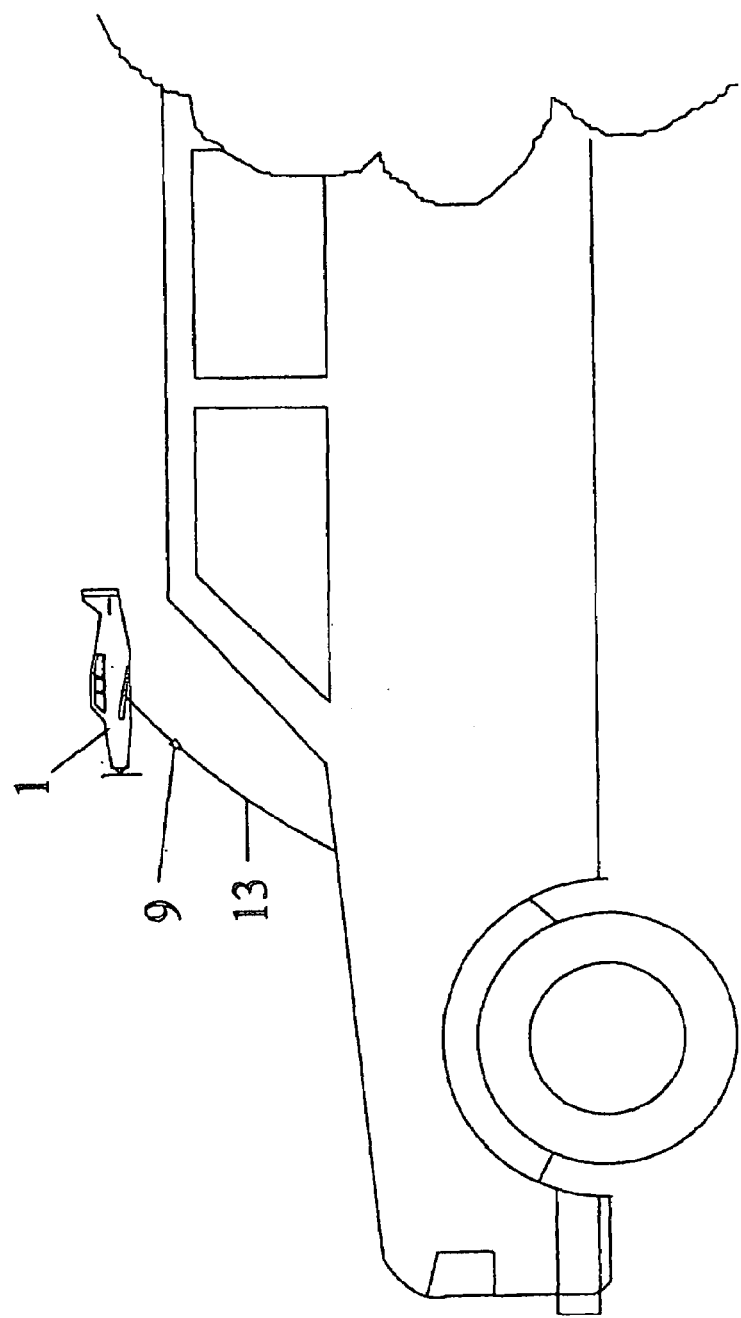
FIG. 2. illustrates the invention as mounted on a vehicle in motion.
Figure 5:
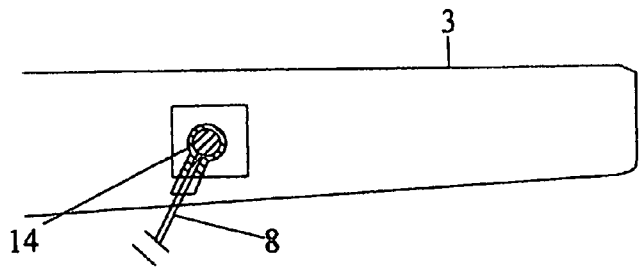
FIG. 5. is a top view of the attachment shaft with spherical object on one end rotationally engaging the recessed concave indention within the wing.
Figure 6:
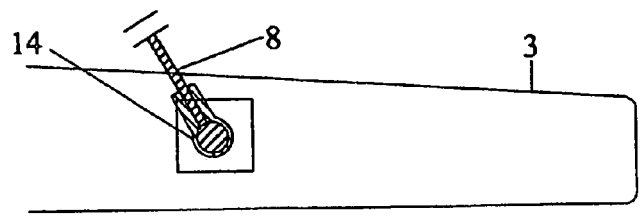
FIG. 6. is a bottom view of the attachment shaft with spherical object on one end rotationally engaging the recessed concave indention within the wing.
Figure 7:
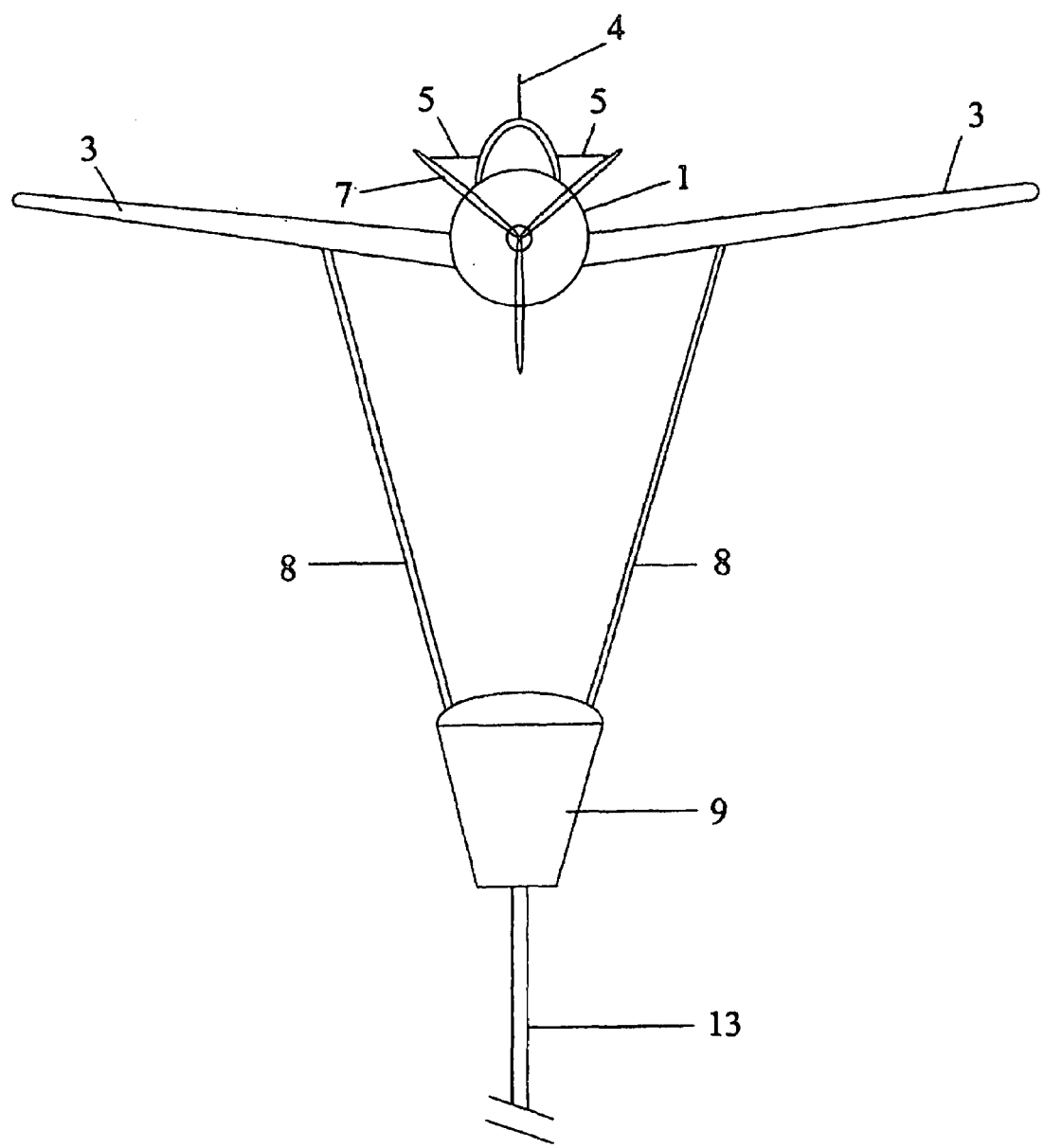
FIG. 7 is a front view illustrating the invention attached to a vehicle antenna.

With the invention attached to a vehicle antenna (13) as shown in FIG. 2, the vehicle is set in motion. As induced drag pulls the ornament rearward, causing the shaft of the antenna (13) to bend, the ornament pivots on the spheres on the end of the ornament attachment shafts (8) which are engaged within the recessed concave indention (14) within the wings (3). The attachment shafts (8) pivot through the channels between the recessed concave indentions (14) and the leading edges of the wings (3), as shown in a top view of the wing (3) in FIG. 5 and in a bottom view of the wing (3) in FIG. 6. The elevators (5) on the tail section (2) aid in stabilization by producing lift and moving the tail section (2) upwards thereby allowing the ornament to maintain a level attitude and preventing wing stall and spin. The ornament is thereby stabilized on it's pitch axis. By using two ornament attachment shafts (8), one on each wing (3), as shown in FIG. 7, the ornament is stabilized on it's roll axis, as induced lift and wing flutter is transferred, resisted and "collected" by the collector pylon (9). The ornament is stabilized on it's yawl axis by the vertical rudder (4) on the tail section (2) of the ornamental body (1). Thus, three dimensional stabilization of the Antenna Bird in motion is achieved. Since the channels for the attachment shafts (8) only extend from the recessed concave indentions (14) forward toward the leading edge of the wing (3), when the ornament is not in motion, it will pitch slightly upward until the attachment shafts (8) contact the trailing end of the shaft channels. Thusly, the Antenna Bird will also maintain a level attitude when at rest. On models depicting propeller driven aircraft, the propellers (7) contact the moving air and are rotationally displaced in such a manner as to create rotation of the rotating propeller assembly (6) thereby giving the impression of powered flight.

The end result is an ornament in the form of an aircraft, securely attached to a vehicle antenna, "flying" along beside the moving vehicle as shown in FIG. 2.

I claim:

1. A vehicle antenna ornament for engaging an end of a vehicle antenna terminating in an ornament in the form of an aircraft, the vehicle antenna ornament comprising:

an ornamental element having at least one elongated fuselage with a plurality of wings, at least one elevator and at least one rudder, and said antenna ornament further possessing at least two stabilizer shafts having a solid spherical object securely attached on the upper end of each said stabilizer shaft, each said solid spherical object rotationally engaging said ornament in recessed concave compartments located at opposing points equidistant from the longitudinal axis of said ornamental element, the lower portion of said stabilizer shafts terminating at a tapered collector pylon possessing a central bore, said collector pylon central bore being engaged by an generally cylindrical antenna retainer having a shaft diameter proportional to and allowing frictional engagement of said collector pylon central bore, said collector pylon further having an antenna retainer spline extending from the outward surface of said central bore towards the center line of said central bore, a distance allowing free engagement of the antenna shaft, said antenna retainer further having a cap formed on the uppermost end, the bottom of which engages the top of said collector pylon to prevent vertical displacement of said collector pylon, said antenna retainer further possessing an lateral antenna tip insertion bore, being sized to allow free introduction of said antenna tip, said antenna retainer further having a central bore, beginning at the intersection of said antenna tip insertion bore and extending downward to terminate at the lower end of said antenna retainer shaft, said central bore being sized to allow free engagement of said antenna shaft, said antenna retainer further having an antenna insertion channel proportional to and allowing free introduction of the shaft of said vehicle antenna into said central bore of said antenna retainer, said antenna insertion channel further being engaged by said antenna retainer spline as said collector pylon is frictionally engaged by said antenna retainer.

2. A vehicle antenna ornament as recited in claim 1, wherein said ornament is in the form of a civilian aircraft, military aircraft or spacecraft with coordinating colors and marking indicia representative of a predetermined, specific aircraft.

3. A vehicle antenna ornament as in claim 1, wherein said ornament, further incorporates a propeller assembly having a plurality of pitched propeller blades wherein said propeller blades are rotationally displaced due to induced wind forces engaging the pitched portion of said propeller blades as said ornament is pulled forward by said vehicle antenna.

* * * * *